INVENTORS
Ralph G. Whitlock
Lewis Sharp

Patented Apr. 20, 1937

2,077,602

UNITED STATES PATENT OFFICE 2,077,602

SAFETY REFILLABLE DISPENSER

Ralph G. Whitlock, Los Angeles, and Lewis Sharp, Huntington Park, Calif., assignors to Federal Foundation Inc., Las Vegas, Nev., a corporation of Nevada Application October 8, 1934, Serial No. 747,356

33 Claims. (Cl. 221—67)

This invention has for its object the provision of a novel tell-tale apparatus for general use in connection with any appliance, the requirements of which are satisfied by keeping a control and check of the activities of trusted employees who have to operate such appliances. It finds one of its chief embodiments in a dispenser for fluids and the like apparatus.

The device of this invention is primarily intended for use in gasoline and oil dispensing stations and is applicable to the dispensing tanks from such stations, but it is equally adaptable for use in connection with other dispensing apparatus.

The general object of the invention is the provision of means for maintaining a dispensing tank under perfect control at all times in order that a record may appear of every ounce of liquid dispensed from the tank and that the tank may not be opened for refilling by unauthorized persons, or by an authorized person until a predetermined amount remaining in the tank has been reached.

Another object is the provision of means for making the dispensing mechanism inoperative when the liquid reaches a predetermined low level.

A further object is to embody in the structure of the invention a complete refilling record in the form of a seal arranged in such a manner that this record must become partially mutilated upon opening the apparatus thereby offering permanent evidence that the apparatus has been opened.

A further object of the token seal referred to, containing a record, is that the token seal is never totally destroyed, but always retained as a record of the opening and closing of the upper and lower covers, and said token seal is only partially mutilated to show its having been once used, but is retained for the record of the opening and closing of the upper and lower covers, permitting access to the tank.

Another object is the provision of means for gaging the liquid level within the apparatus without removing any part from the device and thereby to prevent the necessity of an opening which would permit unauthorized refilling.

A further object is to provide means for controlling the dispensing apparatus in such a manner that, when a predetermined level in the apparatus is reached, the device is automatically locked against operation.

Another object is the provision of means for releasing the dispensing mechanism for operation upon the completion of each authorized refilling operation.

The many further objects and advantageous features of the invention are hereinafter fully described and illustrated in the accompanying drawings, of which.

Figures 1, 19, 20, 21:
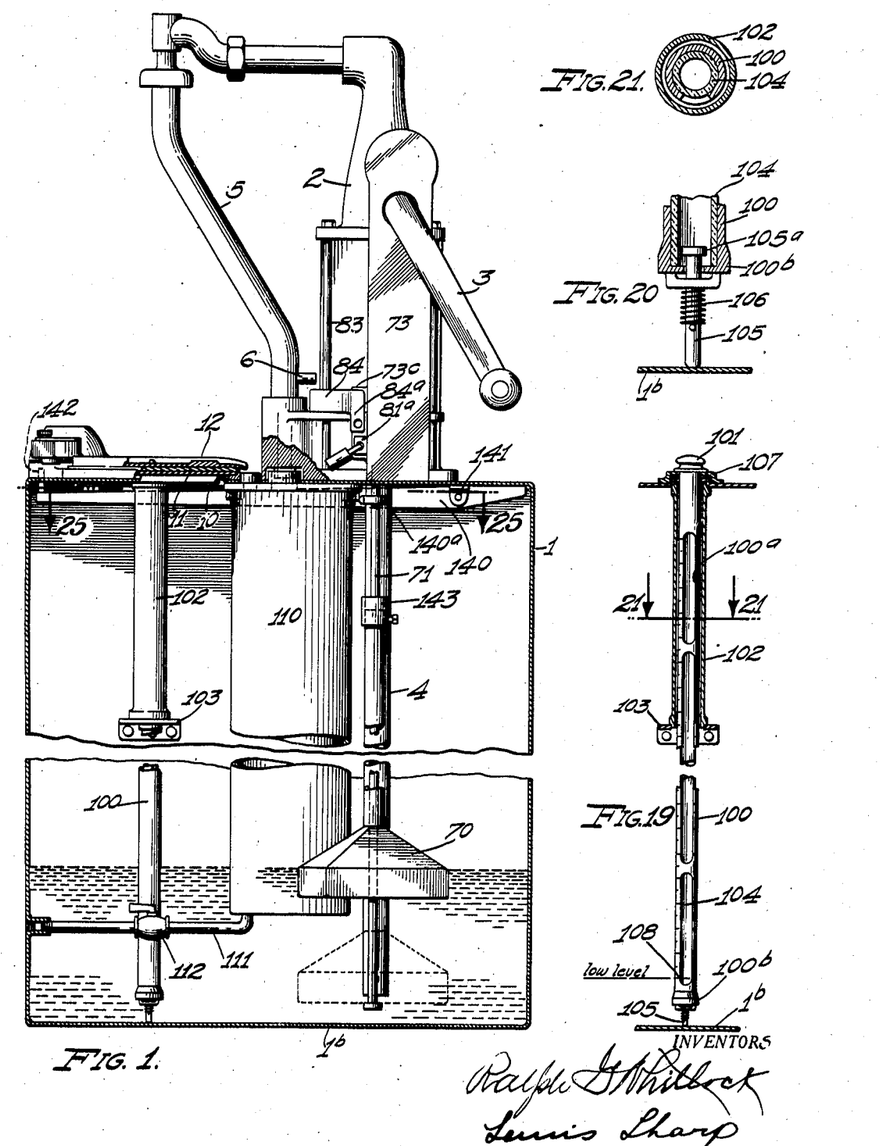
Fig. 1 is a side elevation partly in section of a device embodying the invention.
Figs. 19, 20, and 21 are fragmentary views of parts of Fig. 1.

Referring in the first instance to Fig. 1, the numeral 1 denotes an oil dispensing tank such as is ordinarily used in dispensing stations. This tank is fitted with a draw pump of any well-known commercial type enclosed within a casing 2 and operable by means of a crank 3 to draw liquid through a pipe 4, terminating near the bottom of the tank. The pump is fitted with a rotatable drip pipe 5 which normally may be swung sidewise, away from the pump, preparatory to the dispensing operation. This mechanism will be further referred to later.

In the top plate of the tank is shown a circular opening 10, and this opening is normally maintained closed by a lower cover 11 and an upper cover 12. The latter is shown made with a lug 12ª normally registering with a perforated lug 1ª of the tank, and a padlock 13 is shown seated in the perforations of these lugs. This padlock forms the first control element of the apparatus.

Figures 11, 12, 13, 14:
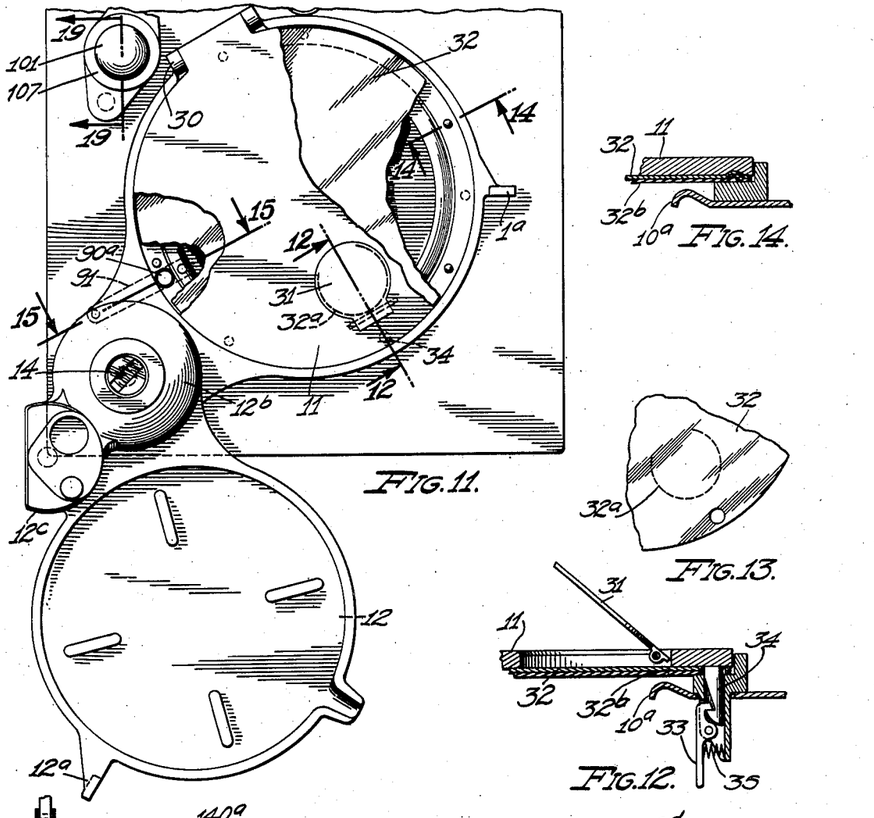
Fig. 11 is a plan view substantially in agreement with Fig. 2, showing the refill control mechanism partly opened.
Fig. 12 is a fragmentary view taken substantially on line 12 of Fig. 11 in the direction of the arrows.
Figs. 13 and 14 illustrate further details of Fig. 11.

The upper cover 12 is pivoted at 14 for horizontal movement to be brought into the open position shown in Fig. 11 and thereby exposing the lower cover 11. The operation of the upper cover is controlled in a manner which will now be described.

The pivot 14 is held stationary by a nut 15, engaging screw threads at the lower ends of the pivot, and an annular plate 16 is rigidly secured to the pivot near its upper end. The upper cover terminates in a substantially hemispherical dome 12ᵇ axially alined with the pivot, and this dome carries an upper annular disk 17 and a lower annular disk 18, both of which are rigidly secured to the bowl portion of the cover by means of screws 19 and 20.

From this, it is seen that the cover, in rotating on its pivot, carries with it the two annular disks 17 and 18 while the plate 16 remains stationary with the pivot. The plate 16 is shown made with a flange 16ª downwardly extending to fill the space between the disks 17 and 18 and thereby to maintain the cover axially immovable on the pivot.

Figure 2:
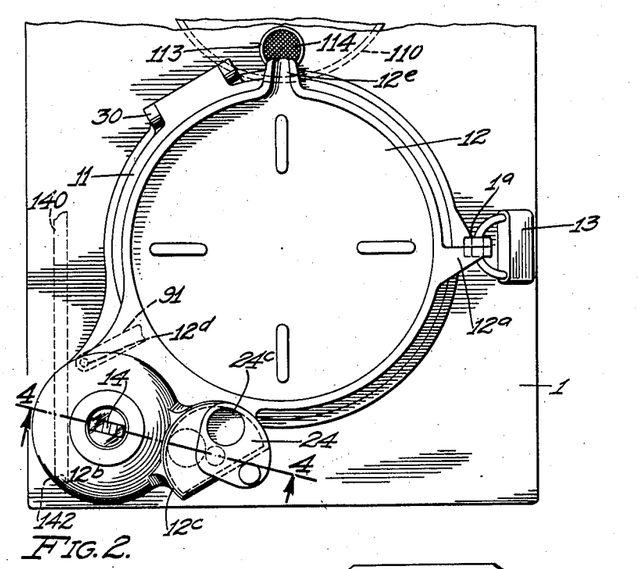
Fig. 2 is a plan view on a larger scale, showing the refill controlling mechanism of the device in closed position.
Figures 3, 4:
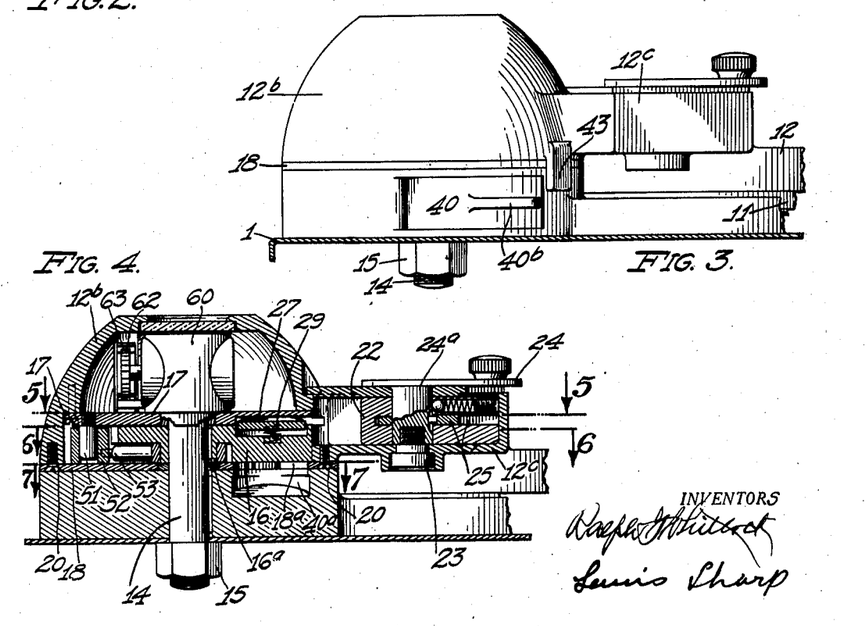
Fig. 3 is a side elevation on a still larger scale of portions of Fig. 2.
Fig. 4 is a sectional elevation substantially corresponding to Fig. 3.
Figures 5, 8:
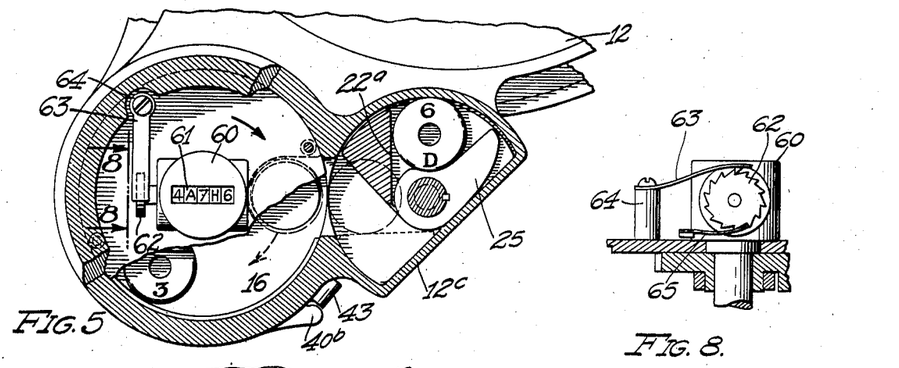
Figs. 5, 6, and 7 are sectional plan views taken substantially on lines 5, 6, and 7 of Fig. 4, respectively, in the direction of the arrows.
Fig. 8 is a fragmentary view taken substantially on line 8 of Fig. 5 in the direction of the arrows.
Figures 6, 9:
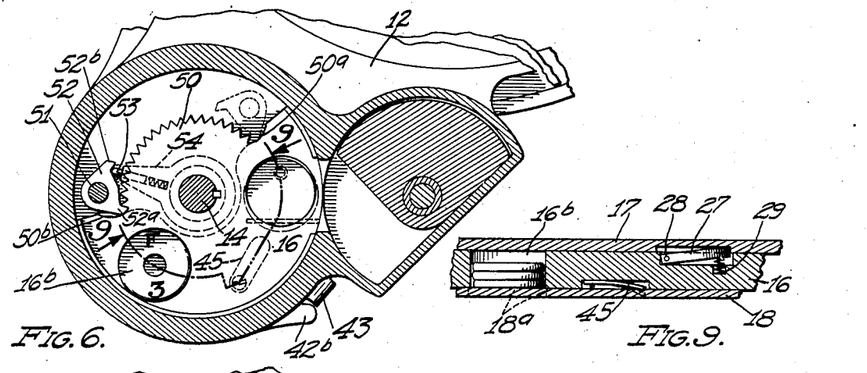
Fig. 9 is a similar view taken on line 9 of Fig. 6 in the direction of the arrows.

The dome portion is made with a box-shaped extension 12ᶜ within which a token carrier 22 is seated to rotate. The extension 12ᶜ is shown substantially semi-circular, and it is made with a central perforation in which is seated a stud 23, supporting the pivot 24ª of a token pusher 24. The token carrier 22 is shown centrally slotted to admit a finger 25, and this finger is mounted to rotate with the pivot 24ª. The token pusher is made with a perforation 24ᶜ of a size to admit a token and to permit this token to drop into the slot of the token carrier in front of the finger 25 when the token pusher is in the withdrawn position shown in Fig. 2. The operator now rotates the token pusher, causing the token, which is held between the finger 25 and the wall 22ª of the token carrier slot, to move forward until the position shown in dotted outline is reached. Further movement of the token pusher causes the finger 25 to push the token through a slot in a dome portion of the cover and to reach the position indicated in the full outline in Fig. 5. The plate 16 is, at this point, made with a perforation in which a catch 27 is seated. This catch, as best shown in Fig. 9, comprises a substantially circular disk pivoted at one side on a pin 28 and held upwardly tilted into the perforation of the upper disk 17 by means of a suitable spring 29.

This catch normally locks the upper cover 12 against rotation on its pivot, but, when the token has been pushed onto the stationary plate 16, it is seen that it depresses this catch, permitting the cover to become released, and it may now be swung into the position shown in Fig. 11. In operation the token controlled closure mechanism functions as follows: Its purpose is to prevent opening of the upper cover 12 until the liquid level drops and a token or check is inserted into this mechanism.

A fresh token is required to be inserted for each separate operation of the upper laterally swinging cover 12. With the parts normally shown in Figure 2 both covers 12 and 11 are closed. Latch 27 prevents the plate 17 carried by cover 12 from moving; hence cover 12 also cannot move to open position.

The operator inserts token into hole 24ᵇ of the token pusher 24. The token drops into slot of the token carrier 22 so as to be engaged by the token finger 25. The operator next operates the token pusher 24, causing this token finger to push the token through slot M in the dome portion of cover 12 and in a position to be forcibly wedged between plate 17 and catch 27, so that the token seats upon catch 27 and depresses the catch against the tension of spring 29. This being accomplished the operator may swing outer cover 12 to open position.

When the cover reaches the limit of its open position the token drops or falls by gravity into the stationary magazine and in this magazine the token remains until the outer cover is swung back by the operator to fully closed position.

At this time another token in the magazine drops by gravity into the fixed chute 40 by way of slot 18ª in plate 18, already explained, where it may be removed. Hence it is apparent that a token is discharged by the control mechanism each time the closure is opened.

The lower cover 11 is now exposed and is shown mounted at one side for vertical rotation on a pivot 30. Diametrically opposite this pivot is provided a small, hinged door 31 which may readily be lifted to disclose an annular recording seal 32. This seal is preferably made from fragile material such as heavy paper, and it is, at 32ª, directly beneath the door 31, made partly perforated, as best indicated in Fig. 13, to permit the operator to push his finger through this portion of the seal and to reach a pawl 33, engaging a latch 34 of the lower plate 11. He may then swing this pawl on its pivot against the tension of a spring 35 to release the cover which he thereupon swings open with his finger totally to uncover the recording seal 32. This seal may then be lifted out entirely to uncover the opening 10 whereupon the apparatus may be refilled and a record made by the operator on the recording seal of the necessary data pertaining to the refilling operation. The recording seal 32 is, in Fig. 14, shown made in two layers, the lower layer 32ᵇ, being preferably composed of oil or gasoline resisting material.

A new recording seal may now be placed and the lower cover 11 closed to permit the pawl 33 again to engage the latch 34 to lock this cover in position, whereupon the upper cover 12 may be returned on its pivot to its initial position.

During this opening and closing operation of the upper cover 12, the token has been delivered into a discharge chute 40 in the following manner: While the upper cover was swung into open position, the token was held in the perforation of the upper disk 17 and carried forward with this disk. Now it is noticed that there is a second perforation 16ᵇ in the stationary plate 16, forming a token magazine, and it is to be noted that this magazine is positioned to register with the perforation in the upper disk 17 when the cover is fully opened and to permit the token to drop through this perforation into the magazine, see also Fig. 9.

This magazine is proportioned to hold a number of tokens. It is important to note that each token carries on its face recording symbols by means of which the identity of the persons manipulating the control mechanism may be established.

Figure 7:
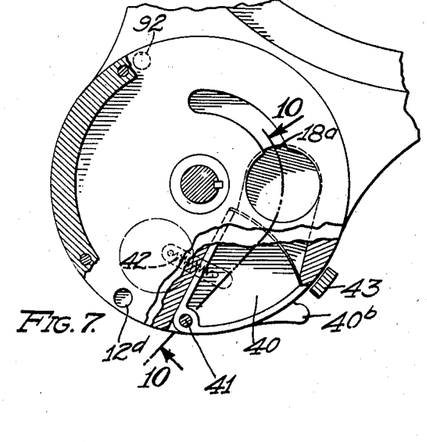
Figure 10:
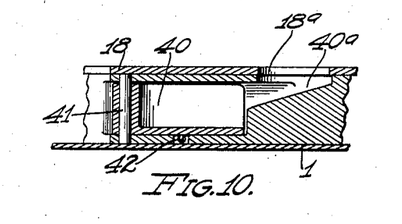
Fig. 10 is also a fragmentary view taken on line 10 of Fig. 7 in the direction of the arrows.

In the lower disk 18 is provided a similar perforation 18ª which, when the cover is fully opened, registers with the magazine to permit the lowermost token in the magazine to drop into this perforation and to be carried with the disk 18, when the cover is returned, to a position directly above an inlet 40ª of the chute 40, as best shown in Figs. 7 and 10. The chute is made with a fingerpiece 40ᵇ by means of which it may be swung on its pivot 41 to expose the token which then may be withdrawn by the person authorized to handle this token. The chute returned to closed position by means of a suitable spring 42.

In the stationary plate 16 is shown mounted a spring finger 43, see Figs. 6 and 9, under which the token is forced to travel when the cover is returned to closed position. This finger forms an additional safeguard against unauthorized operation by preventing a person having succeeded in reinserting the discharge token through the inlet 40ª into the disk perforation 18ª from swinging the upper cover open because, in attempting such opening movement, it is seen that the token will strike the forward end of the springfinger 45 and there be arrested.

In order to make the device of the invention operable, it is necessary to provide a full-stroke mechanism, and such mechanism is, in Fig. 6, shown to comprise a stationary segment 50 provided on its periphery with a series of V-shaped teeth. In the upper disk 17 is fastened a pendent stud 51 on which a rocker 52 is hung, and this rocker is made with spaced projections 52ª and 52ᵇ between which a spring-held plunger 53, of a rotatable arm 54, is positioned to operate. While the upper cover is closed, this rocker remains in the position shown in Fig. 6. During the opening movement of the cover, it is seen that the projection 52ª rides over the teeth of the segment against the pressure of the springheld plunger 53 until the cover approaches the limit of its movement at which point the rocker strikes a stationary stop 50ª, causing the rocker in the first place to swing on its pivot and to assume the position shown in dotted outline in Fig. 6, at which position the cover comes to a stop. The angle of the rocker surface intermediate the two projections becomes sufficiently changed, due to this rocking motion, to force the plunger 53 to slide across the surface of the rocker and to come to a stop against the projection 52ª. When now the cover is returned to a closed position, it is seen that the rocker can slip over the teeth of the segment and that when closed position is approached, it strikes a second stop 50ᵇ again to become reversed and to stop the cover in closed position. In the drawings, the segment 50 and the stops 50ª and 50ᵇ are shown cut out of the stationary plate 16, but they may, of course, be separate parts if preferred.

Means is provided for recording each opening operation of the upper cover 12. Such means is here shown to comprise a counter 60 rigidly mounted on top of the stationary pivot 14 and provided on top with a window through which a series of numeral wheels 61 appear. The dome portion 12ᵇ is made with a window positioned directly above this counter through which an inspection of the counter is available at all times. To the end of the counter shaft is affixed a ratchet wheel 62, and this wheel is engaged by a resilient pawl 63 which in turn is carried on a post 64 of the upper disk 17. This pawl is positioned to turn the wheel 62 one tooth each time the cover is opened and thereby to add a unit in the counter. A backlash pawl 65 is provided to prevent rotation of the ratchet wheel 62 in the opposite direction, see Fig. 8.

Figures 16, 17, 18:
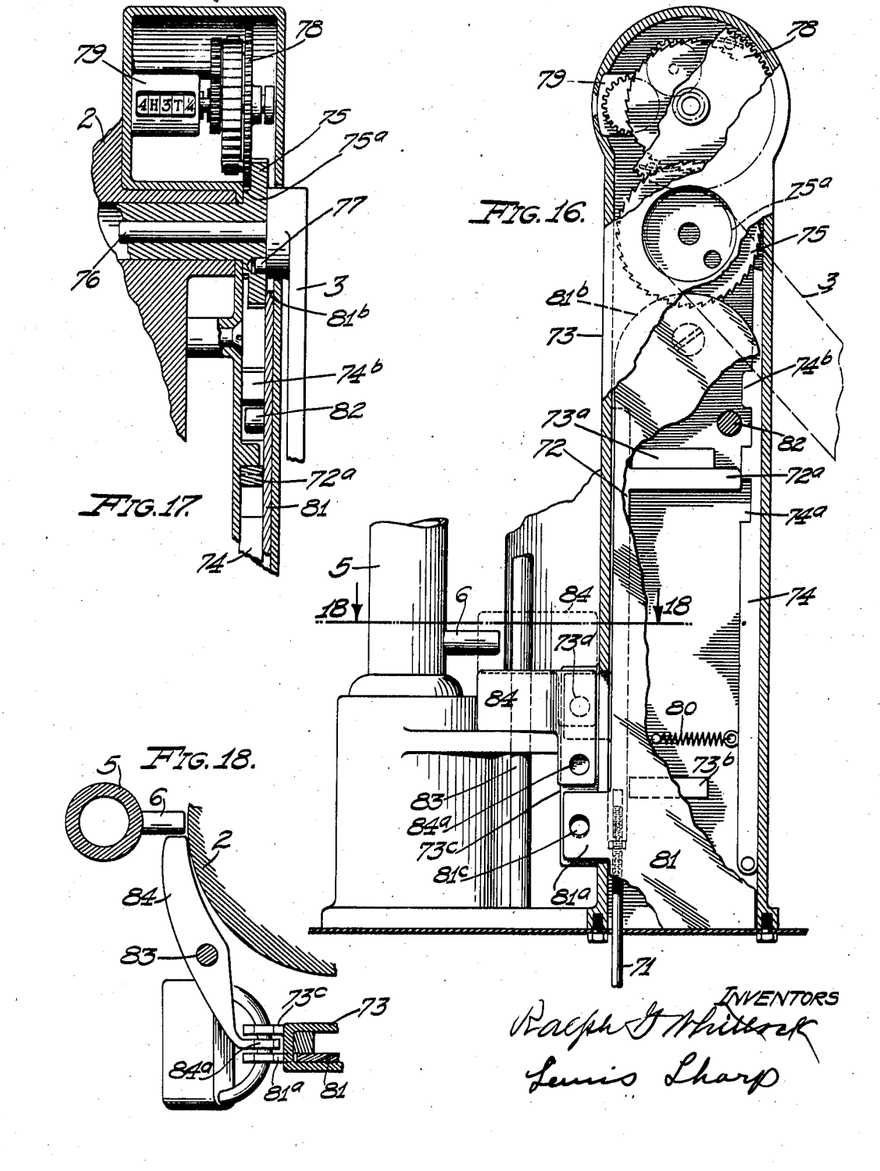
Fig. 16 is a side elevation partly in section of the pump control mechanism of the device.
Fig. 17 is a fragmentary sectional front elevation substantially in agreement with Fig. 16.
Fig. 18 is a fragmentary plan view illustrating portions of Fig. 16.

When the covers 11 and 12 are fully and properly closed, the pumping mechanism is released for operation in a manner which will be described presently, and liquid may be dispensed until a certain predetermined level is reached. Referring now to Figs. 1, 16, and 18, it is noted that a float 70 is adjustably carried within the apparatus on a rod 71 and that the latter is adjustably secured to a slide 72, held in position between a wall of the casing 73 and stationary stops 73ª, 73ᵇ of this wall. This slide is made with a projection 72ª which normally rides on the outer surface of a hinged lockbar 74. Above this bar is shown mounted a ratchet wheel 75, and this ratchet wheel is centrally perforated to receive a spindle 76 of the crank 3. A pin 77 is mounted in the hub of this crank for engagement with a pocket in the ratchet wheel for the purpose of rotating the latter with the crank. The ratchet wheel is made with a shoulder portion 75ª, in which gear teeth are cut, and these teeth mesh with a gear 78 of a dispensing counter 79.

As shown, the crank is detachable. When it is inserted in the hub of the ratchet wheel 75, it may normally be rotated to dispense liquid, each rotation of the crank corresponding to one pint of liquid dispensed, and a corresponding count is set up in the counter at each rotation of the crank. It is to be noted that this counter is made with indicating wheels showing both units corresponding to each complete rotation of the crank, and fractions registering quantities dispensed upon partial rotations, making it possible to record even the smallest quantities dispensed. When a predetermined level of the liquid is approached, it is to be noted that the float 70 commences to sink and to bring the projection 72ª into line with a notch 74ª of the bar 74 thereby to permit a spring 80 to draw the bar into engagement with the teeth of the ratchet wheel 75 and to stop all further rotation of the crank.

The crank is made detachable in order that the operator may insert it to dispense and to carry it away with him upon the completion of this operation in order to prevent unauthorized persons from operating the pump. A plate 81 is placed within the front wall of the casing 73, and this plate is made with a lug 81ª which projects through a slot in the casing. This plate is vertically slidable within the casing, and, when it is moved upward, it is noticed that its upper semi-circular portion 81ᵇ rises to cover the perforation of the ratchet wheel 75 in which the spindle 76 of the crank is insertable. In the lug 81ª is provided a perforation 81ᶜ which is brought into alinement with a perforation 73ᵈ of the casing projection 73ᶜ when the plate 81 is elevated, whereupon a padlock may be inserted through these perforations to lock the plate in elevated position. A projection 82 is provided on the plate positioned normally to clear the bar 74, but, when this bar has been moved forward by a spring 80 to lock the ratchet wheel against rotation, it is noticed that the projection 74ᵇ advances into the path of travel of this projection, causing the latter to push the bar out of the way as it travels upward and again when it returns to its initial position. If, in the meanwhile the apparatus has been refilled, it is readily seen that this projection, in its downward travel, operates to release the ratchet wheel for rotation by the crank.

A rod 83 is shown mounted intermediate the casing and the spout 5, and this rod serves to support a lever 84, which is vertically slidable on the rod, to a position in front of a projection 6 of the spout. This position is shown in dotted outline in Fig. 16. The lever 84 is made with a downwardly directed lug provided with a perforation 84a which, when the lever is elevated, is brought into line with the stationary perforation 73d. If, at the same time, the plate 81 is raised as aforesaid, it is to be noted that a padlock may be applied to lock both the plate and this lever in their proper positions to prevent insertion of the crank and rotation of the spout. This position is indicated in Fig. 18.

Figure 15:
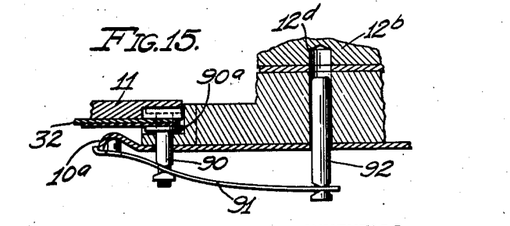
Fig. 15 is a fragmentary view taken substantially on line 15 of Fig. 11 in the direction of the arrows.

It was above stated that the record seal 32 becomes partially mutilated in order to open the refill covers and that a new record seal must be inserted before the covers again are closed. In Fig. 15 is shown a plunger 90 seated in the flange 10a of the opening 10 and provided with an enlarged head 90a. A resilient member 91 is shown in Fig. 15 normally to urge this plunger upward. This member is fitted at its outer end to support a pin 92 and to elevate this pin into a socket 12d of the extension 12b of the dome portion of the upper cover 12, when this cover is fully opened.

From this it should be clear to anyone versed in the art that, when the lower cover 11 is elevated and the record seal 32 removed, this plunger is free to rise and to force the pin 92 upward. Should now the operator close the lower cover 11 without inserting a new record seal and attempt to swing the upper cover into closed position, it is noticed that the pin 92 holds the upper cover open until the enlarged head 90a is depressed, but that this head now is below the lower cover 11. It might be possible for the operator to depress the enlarged head 90a and to swing the cover into closed position, but this would only result in leaving a permanent record that the operator had failed to put in a new recording seal. Hence, it is seen that it is necessary to replace the record seal in order properly to operate the device.

The means provided for indicating the liquid level within the apparatus is, in Figs. 1, 19, 20, and 21, shown to comprise a tube 100, terminating at the top in a knob 101, by means of which the tube may be elevated within a cylindrical casing 102, and the latter is firmly seated in the top plate of the apparatus and in a bracket 103, projecting from the inner walls of the apparatus. Within this tube is seated a glass tube 104, and windows 100a are provided in the outer tube through which the contents of the glass tube may be examined. At the bottom of the two tubes is provided a valve mechanism, as best indicated in Fig. 20, comprising a plunger 105 fitted at the top with a valve head 105a for registration with a valve seat of the outer tube 100. A spring 106 urges this valve into closed position. When this tubular indicator is lowered into the apparatus to its normally seated position, as indicated in Fig. 19, it is to be noted that the plunger 105 strikes the bottom 1b of the casing and is caused to be retracted slightly against the tension of the spring, thereby to maintain the valve open while the indicator is seated and to permit the contents of the apparatus to rise within the glass tube 104. The moment the indicator is elevated, it is noticed that the spring of the plunger is permitted to close this valve to retain the liquid within the tube while the indicator is being elevated. The outer tube 100 terminates at the bottom in a beveled head 100b which rises through the casing 102 and comes to a stop against a thimble 107 of the top plate of the tank when the indicator is raised, thereby to prevent the removal of the indicator from the apparatus. When the indicator is in this elevated position, it is possible to read the liquid level of the tank through the windows of the outer tube, but, as the indicator cannot be entirely removed, it is not possible to gain access to the interior of the apparatus for unauthorized refilling purposes through the casing in which the indicator is mounted to slide. The indicator is provided with suitable graduations 108, corresponding to such liquid levels within the tank as it may be required to ascertain.

Within the apparatus is mounted a smaller tank 110, provided at the top with an opening through which drippings from the spout 5 may find their way. From the bottom of this tank leads a tube 111 through the outer walls of the apparatus, and this tube is fitted with a normally closed valve 112 provided for the purpose of draining this tank. Access to this valve can only be had through the opening 10 in the top plate. From this it is seen that the tank 110 can only be drained when the two covers 11 and 12 are open. In this manner a check on the contents of this tank may be had by the person authorized to open the apparatus for refilling, making a more accurate record of the performance of the apparatus possible.

During the operation of the device, oil is likely to drop on the cover 12. This cover is shown made with a spout 12e which, when the cover is closed, takes a position directly above an opening 113 to the drip tank 110, to permit such oil to drain into this tank. This opening is covered by screen 114.

Figure 22:
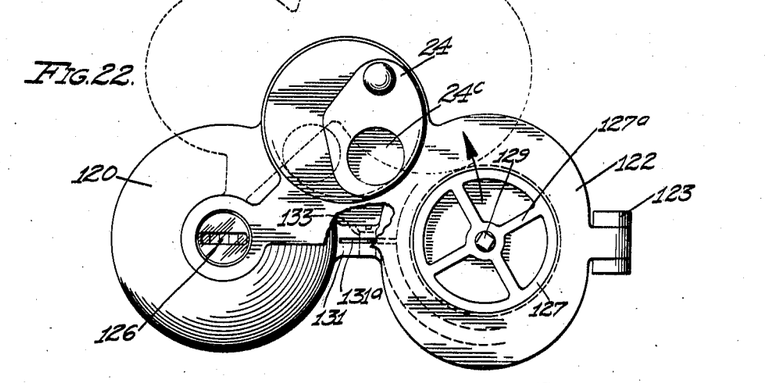
Figs. 22 to 24 illustrate a modified form of refill control mechanism.
Figures 23, 24:
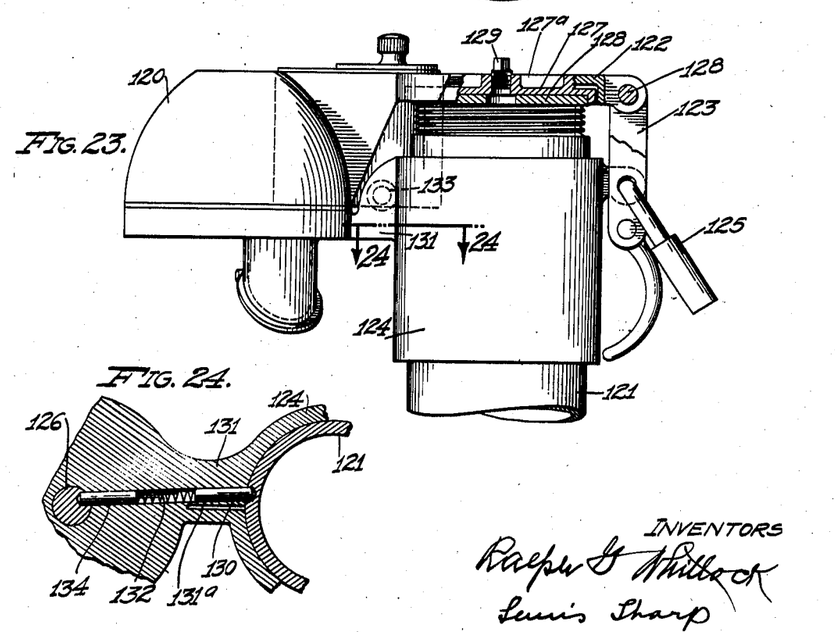

A modified structure is illustrated in Figs. 22 and 24. In these views, the upper cover control mechanism 120 may remain substantially as above described, and no further description of this mechanism is for this reason thought necessary. This control mechanism is, however, not shown mounted on a dispensing tank, but is attached to the refill pipe 121 of an underground tank such as commonly found in gasoline dispensing stations. The upper cover 122 is, in this case, made with a pendent link 123, perforated to register with a perforated lug of a supporting sleeve 124. A padlock 125 is shown inserted in the perforations of these two members to form the first safety control of this modified structure. When this padlock has been opened and the link 123 swung out of engagement with the perforated lug and when the token control mechanism has been operated substantially in the manner above described, the cover 122 may be rotated on its pivot 126 to disclose the opening to this refill pipe. It is to be noted that in this construction, the lower cover has been entirely eliminated.

The cover 122 is shown made with a central perforation, and this perforation is provided with screw threads to receive a threaded disk 127. This disk is made cup-shape to receive within its recessed bottom surface a gasket 128. It is made with a series of upwardly directed ribs or spokes 127a by means of which the disk and gasket may be rotated to press the gasket against the end surface of the refill pipe and turned in the opposite direction to withdraw the gasket from its seat when it is desired to open the cover. A fume plug 129 is shown threaded into a small perforation in the center of the gasket holder, and this plug may be removed at any time it is desired to gage the liquid level within the tank.

The supporting sleeve 124 must be securely mounted on the end of the refill pipe in order to prevent removal of the whole apparatus, and this may be done in any suitable manner. Locking means for this purpose is, in Fig. 24, shown to comprise a plunger 130 seated in the neck 131 which combines the support sleeve with the cover control mechanism proper. This plunger is, by a spring 132, urged forward into a pocket in the side of the refill pipe. When the support sleeve is first mounted on the end of the refill pipe, this plunger is pushed back against the tension of the spring to permit the insertion of the sleeve in the pipe, but, when the sleeve has been properly positioned to bring the plunger in line with the pocket of the sleeve, it is seen that the plunger is free to slip into this pocket. A second plunger 134 is seated in the neck of the support sleeve to enter a pocket in the pivot 126, thereby rigidly to interlock the sleeve and the control mechanism with the refill pipe 121. Once the two plungers have entered the pockets, it is impossible to remove the sleeve or the control mechanism without breaking some part of the device. A slot 131ᵃ is cut into the neck portion of a sleeve, transversely of said slot, and a screw 133 is threaded into the neck portion to draw the sleeve tightly around the end of the refill pipe when the parts have been properly seated as aforesaid.

It is important to provide means, actuated by the float of the tank to control the opening of the tank, in order that it may only be possible to open the covers when a predetermined liquid level is reached.

Figure 25:
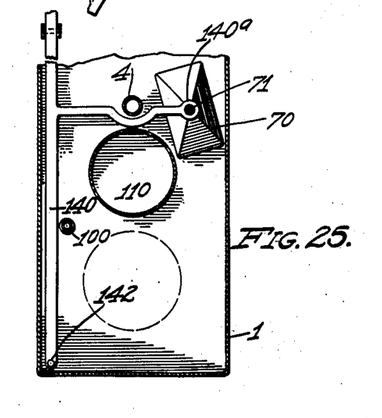
Fig. 25 is a sectional plan view of the liquid tank of the apparatus.

To this end, a crank 140, see Figs. 1 and 25, is pivotally mounted at 141, below the top plate, and this crank carries at its outer end a pin 142 for registration with the socket 12ᵈ of the cover dome, when the cover is closed. The rod 71, of the float 70, is shown fitted with a collar 143, which when the tank is full, strikes the extension 140ᵃ of the crank to elevate the latter and to cause the pin 142 to enter the socket 12ᵈ when the cover 12 is closed. It will be noted that both the collar 143 and float 70 are adjustable upon the rod 4. The float will be caused to abut the collar so both will move in unison with the rod 4, under influence of the fluid level in the tank. The lever or crank 140 rests upon the collar at all times, and when the float descends, so does the collar, which action causes the crank 140 to tilt downwardly as pin 142 is disengaged from the socket.

It is also obvious that the distance of vertical movement of the crank 140 upwardly is determined by the distance the float moves upwardly and as the float may be spaced apart on rod 4, with respect to collar 143, it follows that a predetermined rise or fall of the fluid level in the tank may be caused to shift the crank 140 into position to project pin 142 into the socket 12ᵈ. If desired the lever 140 does not have to rest upon the collar 143, in this event the lever 140 can drop until the innermost end rises and engages the top of the tank, the lever will then be supported with pin 142 disengaged. When the liquid level sinks to a predetermined point, the float is free to sink and to release the crank which, in turn has sufficient movement on its pivot to withdraw the pin 142 and thereby to release the cover 12 for opening.

From this, it is seen, that the cover mechanism is controlled by the liquid level within the tank.

We claim:

1. In a liquid dispensing apparatus, the combination with a tank, of means for dispensing liquid from said tank, refill control mechanism, a recording seal in said mechanism, means responsive to liquid level variations within said tank for controlling the operation of said dispensing means, means associated with said recording seal for controlling the operation of said refill control mechanism, and means actuated by said liquid level responsive means to cooperate with said recording seal associated control means to control the operation of the refill control mechanism.

2. The combination with a tank, of means for dispensing liquid from said tank, a refill control mechanism, a recording seal in said mechanism, and means actuated by said recording seal for controlling the operation of said refill control mechanism.

3. The combination with a tank, of means for dispensing liquid from said tank, a refill control mechanism, a recording seal controlling the operation of said refill control mechanism, and means responsive to liquid level variations within said tank for controlling the said refill control mechanism.

4. The combination with a tank having a refill opening, of a token controlled outer cover for said opening, an inner cover having a finger passage, a latch within the tank maintaining said inner cover closed, and a recording seal having a partly perforated portion in line with said passage yieldable to the pressure of a finger inserted through the passage to release said latch to open the inner cover thereby leaving permanent evidence on said recording seal that the cover has been opened.

5. In a dispensing apparatus, the combination with a tank, of means for dispensing liquid from said tank, a cover mechanism on the tank, a recording seal below said cover mechanism, means within the tank responsive to liquid level variations for controlling the operation of said dispensing means, means associated with said recording seal for controlling the operation of said cover mechanism when the latter is closed, and with the said liquid level responsive means to control the operation of the cover mechanism when the latter is opened.

6. In combination with a tank, means for dispensing liquid from said tank, a refill control mechanism comprising, an upper cover pivotally mounted on the tank for horizontal movement, a lower cover pivotally mounted on the tank for vertical movement, a token operated mechanism for releasing said upper cover for horizontal movement to open the cover, a recording seal below said lower cover, a latch within the tank below said seal for maintaining the lower cover closed, and a passage in the latter for the insertion of a finger to penetrate said recording seal and to reach the latch for the purpose of unlocking the cover.

7. In a liquid dispensing apparatus, the combination with a tank, of a pump for drawing liquid from said tank, a refill control mechanism, a float in the tank responsive to liquid level variations, and means associated with said float for controlling the operation of said pump and of the said refill control mechanism.

8. In a liquid dispensing apparatus, the combination with a tank, of an upper and a lower cover, a mechanism within said upper cover for receiving a token thereby to release said cover for opening, a recording seal below said lower cover, and locking means below said recording seal accessible by penetrating the recording seal to unlock said cover.

9. The combination with a tank, of a pump for dispensing liquid from said tank, an operating shaft in said pump, a ratchet wheel on said shaft, a locking member, a spring urging said locking member into engagement with said ratchet wheel to prevent dispensing operation, a member within said tank responsive to liquid level variations, and an arm mounted on said member, said arm engaging to said locking member normally to maintain the latter inoperative, the locking member being made with a recess with which the said arm comes into registration when a predetermined liquid level is reached thereby to permit the spring to draw the locking member into engagement with said ratchet wheel.

10. The combination with a tank, of a pump, an operating shaft in said pump, an operating handle having projections seatable on said shaft, a ratchet wheel on the shaft, a member in said tank responsive to liquid level variations, a bar on said member for engaging the said ratchet to prevent operation of the pump, an arm on the said liquid level responsive member normally maintaining said bar disengaged but slidable into a recess of the bar when a predetermined liquid level is attained, means for yieldingly urging the bar into engagement with the ratchet wheel, means for covering the seats of said operating shaft when the operating handle is removed, and means embodied in said cover means for releasing said bar from engagement with the ratchet wheel when the handle seats are covered.

11. In a liquid dispensing apparatus, in combination, a pump having an operating shaft, a handle having projections seatable in said shaft, means responsive to liquid level variations within the apparatus for locking said pump against operation when a predetermined liquid level is attained, a member slidable in said pump to cover the seats of said operating handle when the latter is removed, said member being fitted simultaneously to unlock the pump mechanism, a drip pipe on said pump normally held in inoperative position but capable of being swung into operative position, means for locking said drip pipe in inoperative position, and means engaging said slidable member of the pump and the said drip pipe locking means for locking both in position on the pump.

12. In a liquid dispensing apparatus, a pump, an operating shaft on said pump, a ratchet wheel on said shaft, a bar pivotally mounted within said apparatus, a spring urging said bar into engagement with said ratchet wheel to prevent operation of the pump, liquid level responsive means normally maintaining said bar inoperative but positioned to release the bar for locking operation when a predetermined liquid level is attained, an operating handle having projections seatable in said shaft, a member slidable in the pump for covering the seats in said shaft when the handle is removed, said member having a projection engaging said bar to return the bar to inoperative position when the member is moved to cover the seats in said shaft, and means for locking said sliding member in position.

13. In a liquid dispensing apparatus, a pump, a discharge pipe horizontally projecting from said pump, a downwardly directed drip pipe mounted for rotation on said pipe, a drip container in said apparatus above which the mouth of said drip pipe normally is positioned, a projection on said drip pipe adjacent the said mouth, means slidable on the pump into the path of movement of the projection of said drip pipe to prevent rotating the latter into dispensing position, and means for locking said means in position.

14. In a liquid dispensing apparatus, a pump, a ratchet wheel in said pump, a locking bar, a spring urging said locking bar in engagement with said ratchet wheel to prevent operation of the pump, a float in the apparatus responsive to liquid level variations, an arm adjustably mounted on said float and positioned normally to maintain said bar inoperative, but slidable into a recess of the bar when a predetermined liquid level is attained to permit said spring to draw the bar into engagement with the said ratchet wheel.

15. In combination with a container having a filler opening, means movable to render the filler opening inaccessible, means engageable with the first means to hold said first means against movement, a lever for actuating second means, means in said tank supporting said lever, and a float movable with the contents of said tank and engaging said lever to actuate said second means.

16. In combination with a fill pipe, a sleeve on said pipe, closing means for said fill pipe carried by said sleeve, control mechanism for said closing means, and means on said closing means for automatically locking the sleeve in position on said fill pipe.

17. In combination with a fill-pipe, a collar embracing the same, a closure overlying said fill-pipe, means for disengaging said closure to uncover said fill-pipe, including a base casting and a pivot parallel to said fill-pipe upon which said closure may swing, a spring pressed latch having opposing yieldable parts respectively taking into said pivot and into said collar and fill-pipe to securely anchor the casting and collar upon the fill-pipe, and means for locking the closure upon the collar.

18. In a device as described, a tank inlet, a manually perforatable seal covering same, means rendering said seal accessible, means inclosing said first means to render it inaccessible, and manually operable means for rendering the latter means ineffectual.

19. In a device as described, a tank inlet, means swingingly rendering same inaccessible, means registering each swinging of said means to render said inlet accessible, a seal covering said inlet, means locking said first means in its last-named position, and means operable upon removal of said seal for actuating said locking means.

20. In combination with a tank having an inlet, a perforable seal for said inlet, means locking said seal against removal, means in said locking means giving access to the seal to perforate the seal, means for locking said seal locking means in position, and means manually operable through said perforation of the seal to unlock said seal locking means.

21. In a device as described, a tank inlet, closing means therefor consisting of a fixed and a removable part, the fixed part being lockable over the removable part, means for unlocking the fixed part, the removable part being mutilatable to provide for a manual actuation of said unlocking means, and to provide access to said inlet, means for concealedly and releasedly enclosing said closing means, and means operable upon the absence of the removable part of the closing means for locking the enclosing means in released position.

22. In a device as described, a tank inlet, means barring the same releasably, a register indicating successive releasing intervals thereof, token-operated means for actuating the releasing of the barring means, and record-sheet means for tactually controlling the barring position of the barring means.

23. In a device as described, a tank inlet, a record-sheet barring same, means releasedly locking the record-sheet against removal, token-controlled means for rendering said means inaccessible, means for locking the latter means, said token-controlled means moving in one direction to be automatically engaged by the locking means, and means controlled by the presence of the record-sheet for unlocking the token-controlled means.

24. In a device as described, a tank inlet, a record sheet sealing the same, means rendering said record sheet inaccessible, means engaging said first means to render it ineffectual, check-controlled means for controlling the first means, means controlled by the removal of said record sheet for actuating the second means, and means for registering successive operations of the said first means.

25. In a device as described, a tank inlet, a record-sheet seal therefor, means for locking said sheet against removal and having means for exposing the same, means preventing the exposure of said record-sheet, said locking means being releasable to allow the sheet to be removed, a closure for said locking means to conceal the same, said closure movable to closing and opening position, and means operable upon removal of said sheet for locking the closure in open position.

26. In combination with a tank inlet, means rendering same inaccessible, a record-sheet sealing same, located beneath said means, and means operable upon deposit of a token and removal of the record-sheet for rendering said first means ineffectual.

27. In a device as described, a casing having an annular chamber, a concentric fixed shaft therein, a register on top of the shaft, said casing having an extension, tank-inlet control mechanism in said extension including a closure concealing said mechanism and having an annular part swivellable into registering position over said casing so as to uncover said mechanism, a window in said annular part exposing said register for reading, means in said casing preventing retrograde movement of said closure, releasedly, and means controlled by said swivellable closure for actuating said register.

28. In a fluid dispensing device, a tank having an inlet, and an outlet, means releasedly rendering said inlet inaccessible, means for extracting fluid out of said outlet, and fluid-level operated means in said tank for controlling the operation of both means.

29. The combination with a tank of a pump, for discharging liquid from the tank, an operating handle for said pump having a rectangular member seatable in the pump to operate the latter and means for covering the handle seats of said pump when the handle is detached to prevent operation by an unauthorized person.

30. In a device as described, a container for fluids having a filler opening, a tell-tale member mounted so as to protect said opening against filling and being removable to allow filling thereof, a cover enclosing said member, and means for locking said cover releasedly.

31. In a device as described, a container for fluids having a filler opening, a disk arranged to protect said opening against filling, means covering said disk to render same inaccessible, said disk being removable to allow said container to be filled, and means operable upon receipt of a token to render said cover manipulatable to give access to the disk so the latter may be removed to tell-tale the fact that a token has been received.

32. In a device as described, a main tank, a drip tank, a pump having a swivable drip pipe communicating with said drip tank, said drip pipe being normally locked in inoperative position but capable of being swung into operative position and means to hold said drip pipe in communication with said drip tank at all positions to prevent drippings being returned to the main tank of said device.

33. In a device as described, a pump operating shaft having seats, an operating handle therefor having projections for entering any of said seats in said shaft, a slidable member for covering said shaft seats when the handle is removed, a pivotal bar controlling said shaft, said member having a projection engaging said bar to return the bar to inoperative position when the member is moved to cover the seats in said shaft, and means for locking said sliding member in position.

RALPH G. WHITLOCK.
LEWIS SHARP.